US012634723B2

(12) United States Patent
Eglip et al.

(10) Patent No.: US 12,634,723 B2
(45) Date of Patent: *May 19, 2026

(54) SYSTEMS AND METHODS FOR PROVIDING NETWORK FAILURE AND CAUSE CODE HANDLING IN 5G NETWORKS

(71) Applicant: Verizon Patent and Licensing Inc., Basking Ridge, NJ (US)

(72) Inventors: Helen Osias Eglip, Sammamish, WA (US); Sudhakar Reddy Patil, Flower Mound, TX (US); Parry Cornell Booker, Sunnyvale, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/882,357

(22) Filed: Sep. 11, 2024

(65) Prior Publication Data

US 2025/0008354 A1     Jan. 2, 2025

Related U.S. Application Data

(63) Continuation of application No. 17/205,782, filed on Mar. 18, 2021, now Pat. No. 12,108,263.

(51) Int. Cl.
| | |
|---|---|
| *H04W 24/04* | (2009.01) |
| *H04L 41/0631* | (2022.01) |
| *H04W 28/02* | (2009.01) |
| *H04W 28/088* | (2023.01) |
| *H04W 60/04* | (2009.01) |
| *G06N 20/00* | (2019.01) |

(52) U.S. Cl.
CPC .......... *H04W 24/04* (2013.01); *H04L 41/064* (2013.01); *H04L 41/065* (2013.01); *H04W 28/0284* (2013.01); *H04W 28/0289* (2013.01); *H04W 28/088* (2023.05); *H04W 60/04* (2013.01); *G06N 20/00* (2019.01)

(58) Field of Classification Search
None
See application file for complete search history.

(56) References Cited

U.S. PATENT DOCUMENTS

| | | |
|---|---|---|
| 2018/0041378 A1 | 2/2018 | Yan |
| 2018/0192303 A1 | 7/2018 | Hui et al. |
| 2020/0084087 A1 | 3/2020 | Sharma |

OTHER PUBLICATIONS

"5G; Non-Access-Stratum (NAS) protocol for 5G System (5GS); Stage 3 (3GPP TS 24.501 version 15.3.0 Release 15)", Technical Specification: ETSI TS 124 501 V15.3.0 (May 2019), 486 pages.

*Primary Examiner* — Robert M Morlan

(57) ABSTRACT

A network device may receive historical data identifying historical error data and error data categorizations associated with a first core network and may store the historical data in a data structure. The network device may receive a request associated with a user equipment and may receive error data from the first core network based on the request. The network device may receive network health data identifying load levels and health of the first core network and a second core network. The network device may determine possible cause data identifying causes associated with the error data based on the historical data, the error data, and the network health data. The network device may generate a cause code for the user equipment based on the possible cause data and may provide the cause code to the user equipment.

20 Claims, 11 Drawing Sheets

100 ⟶

100 ⟶

100 ⟶

100 ⟶

100 —

FH module 120

AMF 115

Machine learning model

160
Process the possible cause data, with the machine learning model, to generate a cause code for the UE Cause code indicating congestion associated with a network device that is common to the 4G and 5G core networks Cause code indicating congestion associated with a network device of only the 5G core network Possible cause data

100

100

100

175
Connect to the 4G core network, for a time period, based on the cause code

300

Bus
310

500

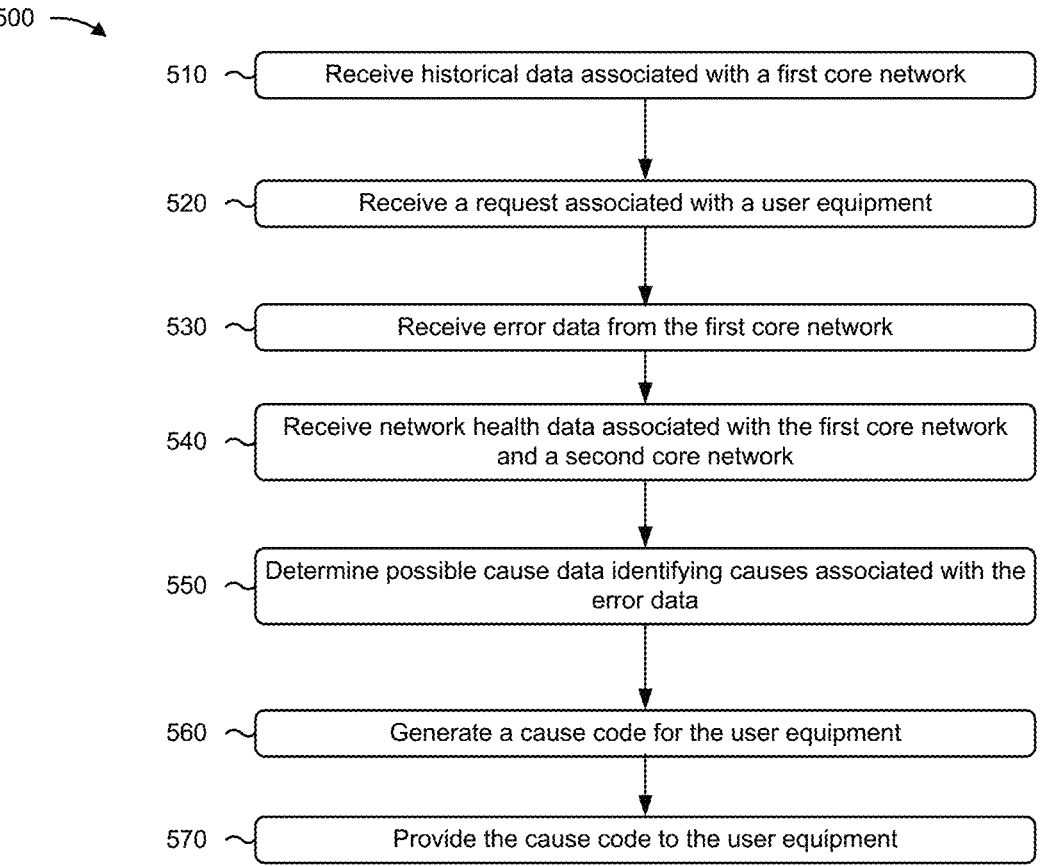

510 ── Receive historical data associated with a first core network

520 ── Receive a request associated with a user equipment

530 ── Receive error data from the first core network

540 ── Receive network health data associated with the first core network and a second core network 550 ── Determine possible cause data identifying causes associated with the error data 560 ── Generate a cause code for the user equipment 570 ── Provide the cause code to the user equipment

FIG. 5

SYSTEMS AND METHODS FOR PROVIDING NETWORK FAILURE AND CAUSE CODE HANDLING IN 5G NETWORKS

RELATED APPLICATION

This application is a continuation of U.S. patent application Ser. No. 17/205,782, entitled "SYSTEMS AND METHODS FOR PROVIDING NETWORK FAILURE AND CAUSE CODE HANDLING IN 5G NETWORKS," filed Mar. 18, 2021, which is incorporated herein by reference in its entirety.

BACKGROUND

When failures occur in a fifth generation (5G) standalone (SA) core network, there is a choice to continue to serve a user equipment (UE) with the 5G SA core network or to push the UE to a fourth generation (4G) core network (e.g., an evolved packet system (EPS) network). Such a decision is typically not binary and requires intelligent decision making based on a variety of factors.

BRIEF DESCRIPTION OF THE DRAWINGS

FIG. 5 is a flowchart of an example process for providing network failure and cause code handling in 5G networks.

DETAILED DESCRIPTION OF PREFERRED EMBODIMENTS

Figure 1A:
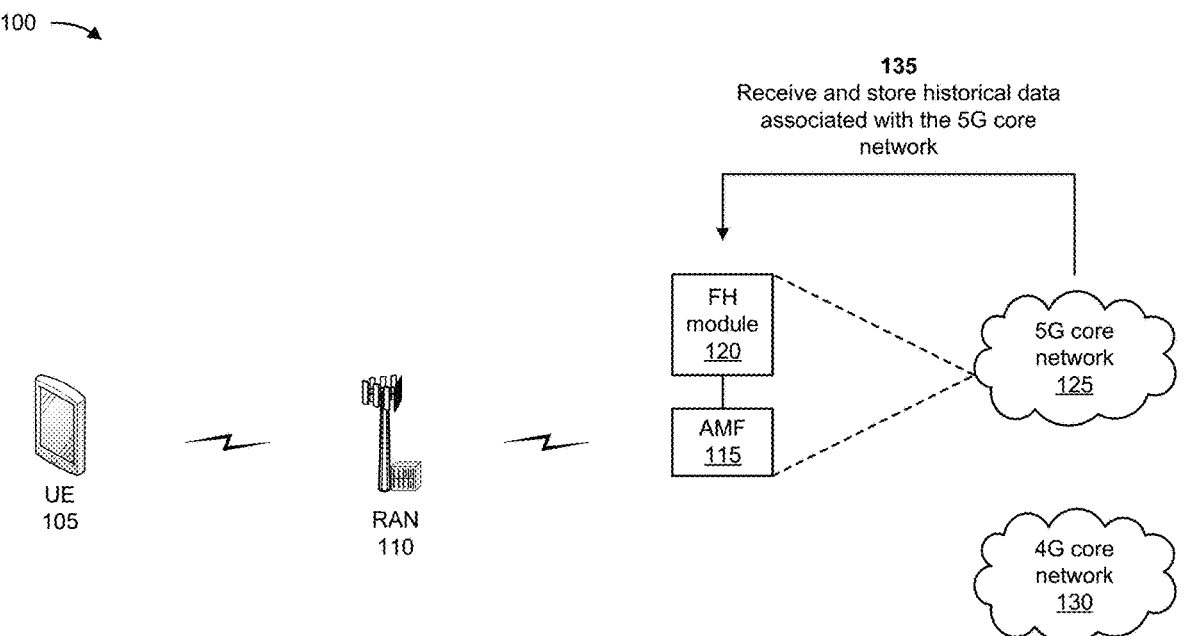
FIGS. 1A-1G are diagrams of an example associated with providing network failure and cause code handling in 5G networks.

The following detailed description of example implementations refers to the accompanying drawings. The same reference numbers in different drawings may identify the same or similar elements.

The third-generation partnership project (3GPP) standards provide a list of 5G cause codes to be used for particular scenarios and corresponding actions to be taken by the UE. An access and mobility management function (AMF) is responsible for providing an appropriate network failure cause code to a UE and for shaping a behavior of the UE based on network conditions. One cause code (e.g., cause code 22) may cause the UE to wait for a time period (e.g., provided by the AMF) before re-attempting to connect to the 5G core network. For example, if a network situation persists and the AMF continues to send cause code 22 to the UE, the UE will continue to attempt to connect with the 5G core network and will not fall back to a 4G core network. Therefore, the UE will be out of service during the time period.

If the AMF does not provide a response to the UE, the UE will attempt to connect with the 5G core network for a predetermined quantity of times (e.g., five times) and then will fall back to the 4G core network. In this case, the UE will be without service for a short time period but will receive service from the 4G core network. Other cause codes (e.g., cause codes 15, 27, and 111) may cause the UE to immediately fall back to 4G core network. The UE may attempt to reconnect to the 5G core network based on an expiration of a time period (e.g., provided by the AMF).

The 5G core network and the 4G core network coexist and share some common network functions. The sharing of common network functions by the 5G core network and the 4G core network may result in various network error scenarios (e.g., errors caused by network congestion) that are not addressed by the cause codes and/or may negatively impact the 5G core network and the 4G core network.

Some implementations described herein include a network device (e.g., an AMF) that provides network failure and cause code handling in 5G networks. For example, the network device may receive historical data identifying historical error data and error data categorizations associated with a first core network and may store the historical data in a data structure. The network device may receive a request associated with a UE and may receive error data from the first core network based on the request. The network device may receive network health data identifying load levels and health of the first core network and a second core network and may process the historical data, the error data, and the network health data, with a machine learning model, to determine possible cause data identifying causes associated with the error data. The network device may process the possible cause data, with the machine learning model, to generate a cause code for the UE and may provide the cause code to the UE.

In this way, the AMF provides network failure and cause code handling in 5G networks. The AMF may support handling of comprehensive error scenarios associated with a 5G core network. The AMF may utilize a machine learning model to determine, based on a variety of network factors, conditions, and condition sources, an appropriate cause code to provide to a UE. The cause code may enable the AMF to appropriately control a behavior of the UE. Thus, the AMF conserves computing resources, networking resources, and/or the like that would otherwise be wasted in providing incorrect cause codes to the UE, causing the UE to unnecessarily re-attempt connection with the 5G core network, causing the UE to unnecessarily connect to the 4G core network, and/or the like.

FIGS. 1A-1G are diagrams of an example 100 associated with providing network failure and cause code handling in 5G networks. As shown in FIGS. 1A-1G, example 100 includes a UE 105 associated with a radio access network (RAN) 110, a 5G core network 125, and a 4G core network 130. The 5G core network 125 may include an AMF 115 and a failure handling (FH) module 120. The UE 105, the RAN 110, the AMF 115, the FH module 120, the 5G core network 125, and the 4G core network 130 are described in greater detail below with respect to FIGS. 2 and 3.

As shown in FIG. 1A, and by reference number 135, the FH module 120 receives and stores historical data associated with the 5G core network 125. The historical data may identify error data and error data categorizations associated with the 5G core network 125. The FH module 120 may receive the historical data associated with the 5G core network 125 periodically, in response to providing a request for the historical data, and/or based on an occurrence of an invent.

The error data may include data associated with errors and/or failures in the 5G core network 125. For example, the error data may include a cause code received by the AMF 115 from a device included in the 5G core network 125, information identifying the device from which the cause code was received, information identifying a network function associated with the cause code and/or the device from which the cause code was received, information indicating a load level of the 5G core network 125 at a time the cause code was received, information indicating a load level of the 4G core network 130 at the time the cause code was received, information indicating a health of the 5G network, information indicating a health of the 4G network, and/or the like. The error data categorizations may include a categorization of error data based on types of UEs, a categorization of error data based on interactions with network devices of the 5G core network 125, a categorization of error data based on a source of a failure associated with the 5G core network 125, a categorization of error data based on the network devices of the 5G core network 125 that are associated with the failure, and/or the like.

In some implementations, the FH module 120 trains the machine learning model to determine a cause code to be provided to a UE. The machine learning model may be trained based on the historical data associated with the 5G core network 125. The machine learning model may be trained to determine, based on information regarding a cause code received by the AMF 115, a cause code to be provided to a UE and a confidence score that reflects a measure of confidence that the cause code is accurate for a current state of the 5G core network 125. Alternatively, and/or additionally, the FH module 120 may obtain a trained machine learning model from another device.

Figure 1B:
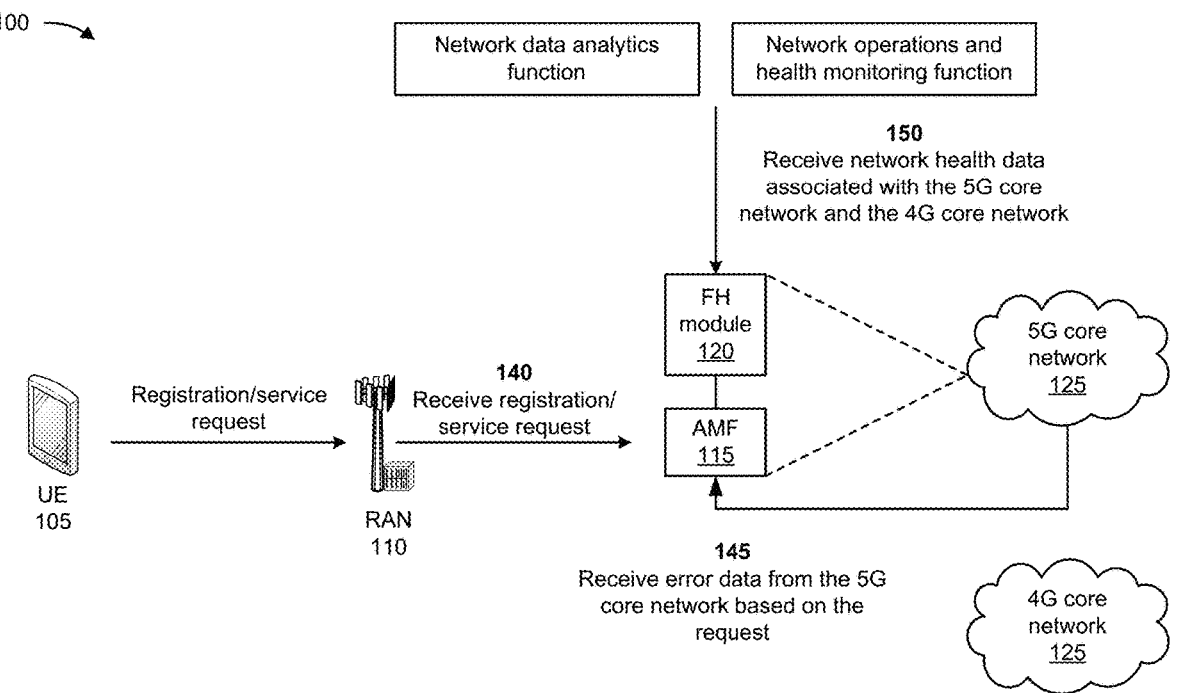

As shown in FIG. 1B, the UE 105 provides a registration and/or service request to the RAN 110. The UE 105 may provide the registration and/or service request to register with the 5G core network 125 and/or to receive services provided by the 5G core network 125. In some implementations, the registration and/or service request includes an initial registration request message. For example, the UE 105 may send an initial registration request message to the AMF 115 via the RAN 110 when the UE 105 first connects to the RAN 110. The initial registration request may include information that identifies the UE 105 (e.g., a mobile device number (MDN), an international mobile equipment identity (IMEI), a temporary mobile subscriber identity (TMSI), and/or the like), information that indicates one or more capabilities of the UE 105 (e.g., one or more communication capabilities of UE 105), information that indicates one or more characteristics associated with the UE 105 (e.g., a location of the UE 105, a movement of the UE 105, and/or the like), authentication information associated with the UE 105, and/or the like.

As shown by reference number 140, the RAN 110 receives the registration and/or service request from the UE 105 and provides the registration and/or service request to the AMF 115. In some implementations, the registration and/or service request may include authentication information associated with the UE 105, and the AMF 115 may authenticate the UE 105 based on the authentication information.

As shown by reference number 145, the AMF 115 receives error data from the 5G core network 125 based on the registration and/or service request. The error data may indicate a failure associated with the 5G core network 125. In some implementations, the AMF 115 receives the error data from the 5G core network 125 based on sending, to the 5G core network 125, a message associated with the registration and/or service request.

As an example, the registration and/or service request may include an initial registration request message. The initial registration request message may include information that identifies the UE 105 (e. g., a string that identifies the UE 105), information that indicates one or more capabilities of the UE 105 (e.g., one or more communication capabilities of the UE 105), information that indicates one or more characteristics of the UE 105 (e. g, a location of the UE 105 and/or a movement of the UE 105, among other examples), and/or the like. The AMF 115 may process the initial registration request message to generate a UE profile registration request message (e. g., a request message to create a profile concerning the UE 105 in a data structure (e.g., a database, a table, a list, and/or the like)) that includes the information that identifies the UE 105, the information that indicates the one or more capabilities of the UE 105, the information that indicates the one or more characteristics of the UE 105, and/or the like. The AMF 115 may send the UE profile registration request message to a device included in the 5G core network 125 (e.g., UDM 220, shown in FIG. 2).

The AMF 115 may receive error data indicating a failure associated with registering the UE profile from the 5G core network 125 based on sending the UE profile registration request message. For example, the AMF 115 may receive a cause code based on the device of the 5G core network 125 failing to register the UE profile for the UE 105. The cause code may be associated with an action to be taken by the UE 105. For example, the cause code may be associated with the UE 105 continuing to try to register with the 5G core network 125, registering with the 4G core network 130, attempting to register with the 5G core network 125 after expiration of a time period, and/or the like. The AMF 115 may provide, to the FH module 120, the error data (e.g., the cause code), information identifying the action associated with the cause code, information identifying the device from which the cause code was received, information identifying an action taken by the AMF 115 that resulted in the AMF 115 receiving the cause code (e.g., the AMF 115 sending the UE profile registration request), and/or the like based on receiving the error data.

As shown by reference number 150, the FH module 120 receives network health data associated with the 5G core network 125 and the 4G core network 130. The network health data may identify load levels of the 5G core network 125 and/or the 4G core network 130. The FH module 120 may request the network health data from a network data analytics function (NWDAF) associated with the 5G core network 125 and/or the 4G core network 130, a network operations and health monitoring function associated with the 5G core network 125 and/or the 4G core network 130, and/or the like. The FH module 120 may request the network health data based on receiving the error data from the AMF 115 and may receive the network health data based on the request. Alternatively, and/or additionally, the FH module 120 may periodically receive the network health data from the NWDAF associated with the 5G core network 125 and/or the 4G core network 130 and/or the network operations and health monitoring function associated with the 5G core network 125 and/or the 4G core network 130.

Figure 1C:
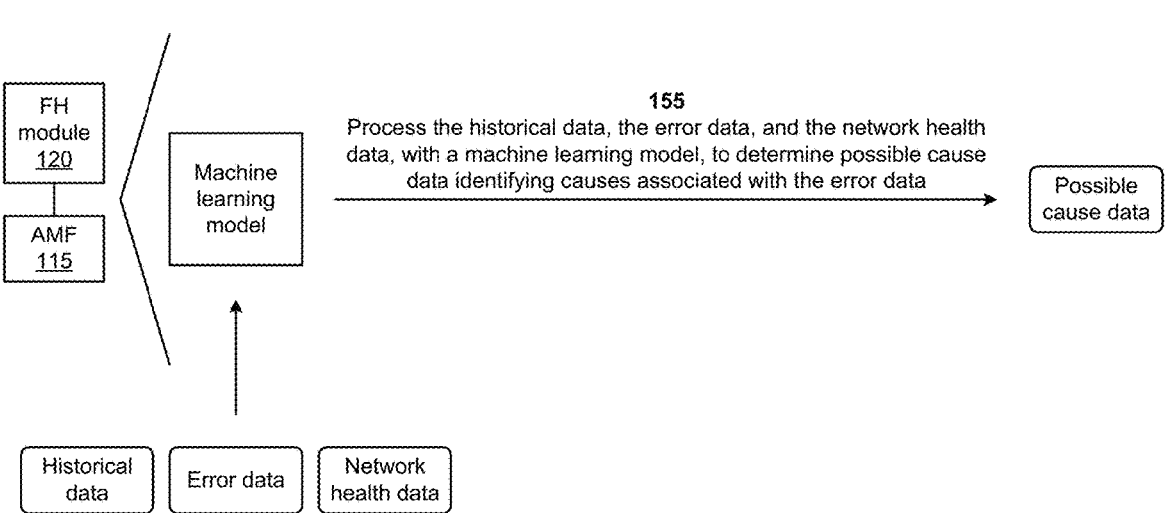

As shown in FIG. 1C, and by reference number 155, the AMF 115 and the FH module 120 process the historical data, the error data, and the network health data, with a machine learning model, to determine possible cause data identifying causes associated with the error data.

Figure 1D:
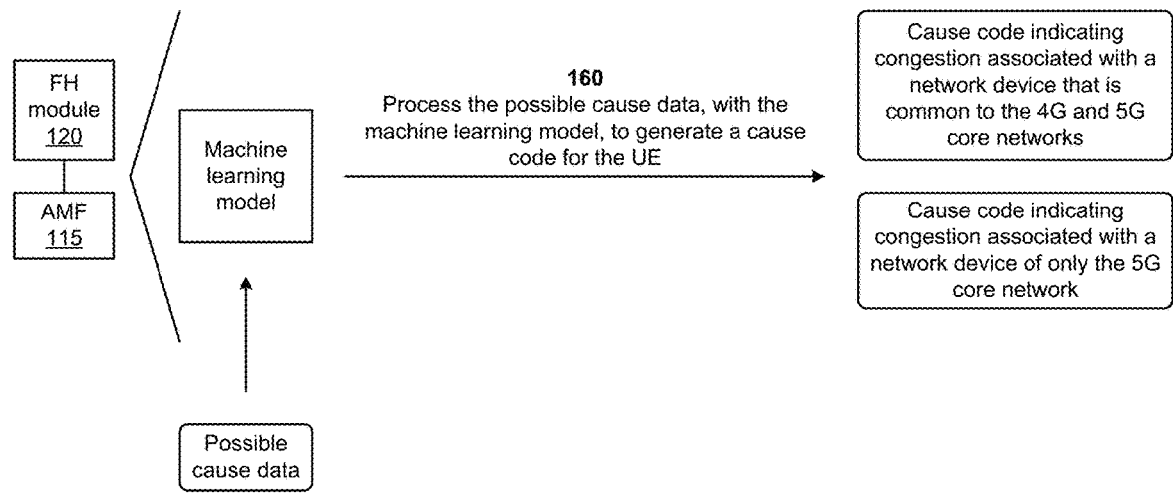

As shown in FIG. 1D, and by reference number 160, the AMF 115 and the FH module 120 process the possible cause data, with the machine learning model, to generate a cause code for the UE 105. The machine learning model may include a classification model, a regression model, a Bayes-Net model, a decision tree model, and/or the like. The FH module 120 may utilize the machine learning model to generate the cause code and a confidence score that reflects a measure of confidence that the cause code is accurate based on the network health data.

The cause code may be generated based on one or more factors associated with the 5G core network 125 and/or the 4G core network 130. The one or more factors may include whether the failure associated with the cause code is transient or persistent, a breadth of an issue associated with the cause code, an impact on the 5G core network 125 associated with continued retries by the UE 105, and/or a probability of the UE 105 receiving services in the 4G core network 130.

The FH module 120 (e.g., the machine learning model) may determine whether the failure associated with the cause code is transient or persistent based on a percentage of requests experiencing failures as a function of time. For example, the FH module 120 may determine a percentage of UE profile registration requests experiencing failures during a time period. The FH module 120 may determine that the failure associated with the cause code is persistent when the percentage satisfies one or more criteria (e.g., when the percentage satisfies (e.g., is greater than, is equal to, and/or crosses) a threshold). The FH module 120 may determine that the failure is transient when the percentage fails to satisfy the one or more criteria.

The FH module 120 may determine the breadth of an issue associated with the cause code based on determining whether the issue is specific to a particular set of UEs, whether the issue is specific to a particular region, whether the issue is specific to a particular market, a percentage of UEs experiencing the issue, an expected loss of service to UEs (e.g., a complete loss of service, a partial loss of service, and/or the like), a source (e.g., a network device and/or a network function) associated with the failure, and/or the like.

The FH module 120 may determine an impact on the 5G core network 125 associated with continued retries by the UE 105 based on a load level associated with the 5G core network 125. The FH module 120 may determine the load level based on the network health data. The FH module 120 may determine that continued retries by the UE 105 may negatively impact the 5G core network when the load level satisfies one or more criteria.

The FH module 120 may determine a probability of the UE 105 receiving services in the 4G core network 130 based on whether a network device and/or a network function associated with the cause code is common to both the 5G core network 125 and the 4G core network 130 and/or a load level associated with the 4G core network 130. The FH module 120 may determine a first probability of the UE 105 receiving services in the 4G core network 130 when the network device and/or the network function associated with the cause code is common to both the 5G core network 125 and the 4G core network 130 and/or the load level associated with the 4G core network 130 satisfies one or more criteria. The FH module 120 may determine a second, higher probability of the UE 105 receiving services in the 4G core network 130 when the network device and/or the network function associated with the cause code is not common to both the 5G core network 125 and the 4G core network 130 and/or the load level associated with the 4G core network 130 fails to satisfy the one or more criteria.

The FH module 120 may provide the generated cause code to the AMF 115. In some implementations, the generated cause code may be the same as the cause code received by the AMF 115. For example, the generated cause code may be the same as the cause code received by the AMF 115 when the machine learning model generates a cause code that is the same as the cause code received by the AMF 115 and/or when a confidence score associated with the cause code generated by the machine learning model fails to satisfy a confidence score threshold.

Figure 1E:
Figure 1E:
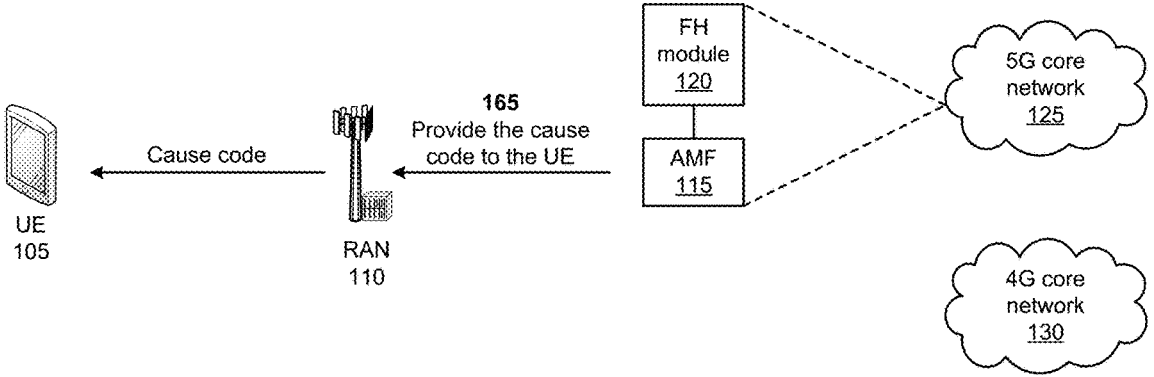

As shown in FIG. 1E, and by reference number 165, the AMF 115 provides the cause code to the UE 105 via the RAN 110. The AMF 115 may provide the cause code generated by the machine learning model to the UE 105 based on receiving the cause code from the FH module 120.

Figure 1F:
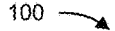
Figure 1F:
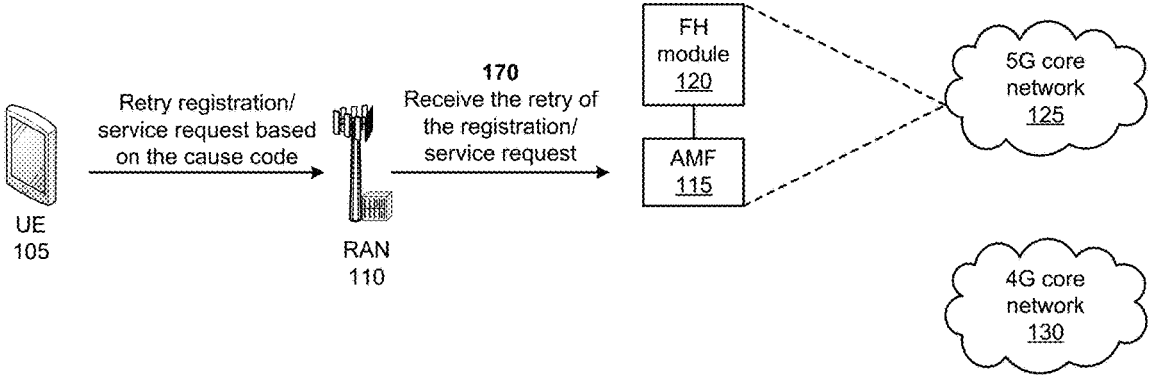

In some implementations, the cause code is associated with the UE 105 re-attempting to register with the 5G core network 125. As shown in FIG. 1F, the UE 105 retries the registration and/or service request based on the cause code. As shown by reference number 170, the AMF 115 receives the retry of the registration and/or service request. The AMF 115 may process the retry of the registration and/or service request in a manner similar to that described above.

Figure 1G:
Figure 1G:
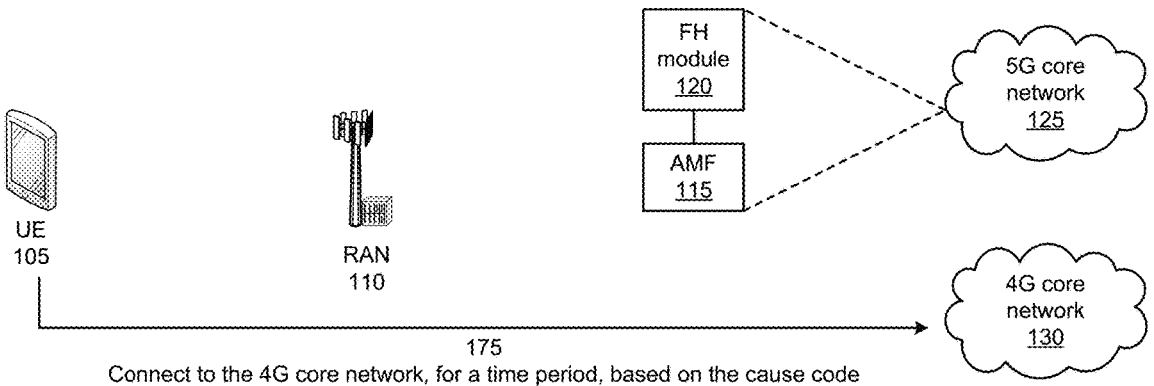

In some implementations, the cause code is associated with the UE 105 connecting to the 4G core network 130. As shown in FIG. 1G, and by reference number 175, the UE 105 connects to the 4G core network, for a time period (e.g., fifteen minutes, thirty minutes, and/or the like), based on the cause code. In some implementations, the time period is associated with the cause code. Alternatively, and/or additionally, the AMF 115 may provide information identifying the time period to the UE 105.

In this way, the AMF 115 and the FH module 120 provide network failure and cause code handling in 5G networks. The AMF 115 and the FH module 120 may support handling of comprehensive error scenarios associated with the 5G core network 125. The AMF 115 and the FH module 120 may utilize a machine learning model to determine, based on a variety of network factors, conditions, and condition sources, an appropriate cause code to provide to the UE 105. The cause code may enable the AMF 115 and the FH module 120 to appropriately control a behavior of the UE 105. Thus, the AMF 115 and the FH module 120 conserve computing resources, networking resources, and/or the like that would otherwise be wasted in providing incorrect cause codes to the UE 105, causing the UE 105 to unnecessarily re-attempt connection with the 5G core network 125, causing the UE 105 to unnecessarily connect to the 4G core network 130, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
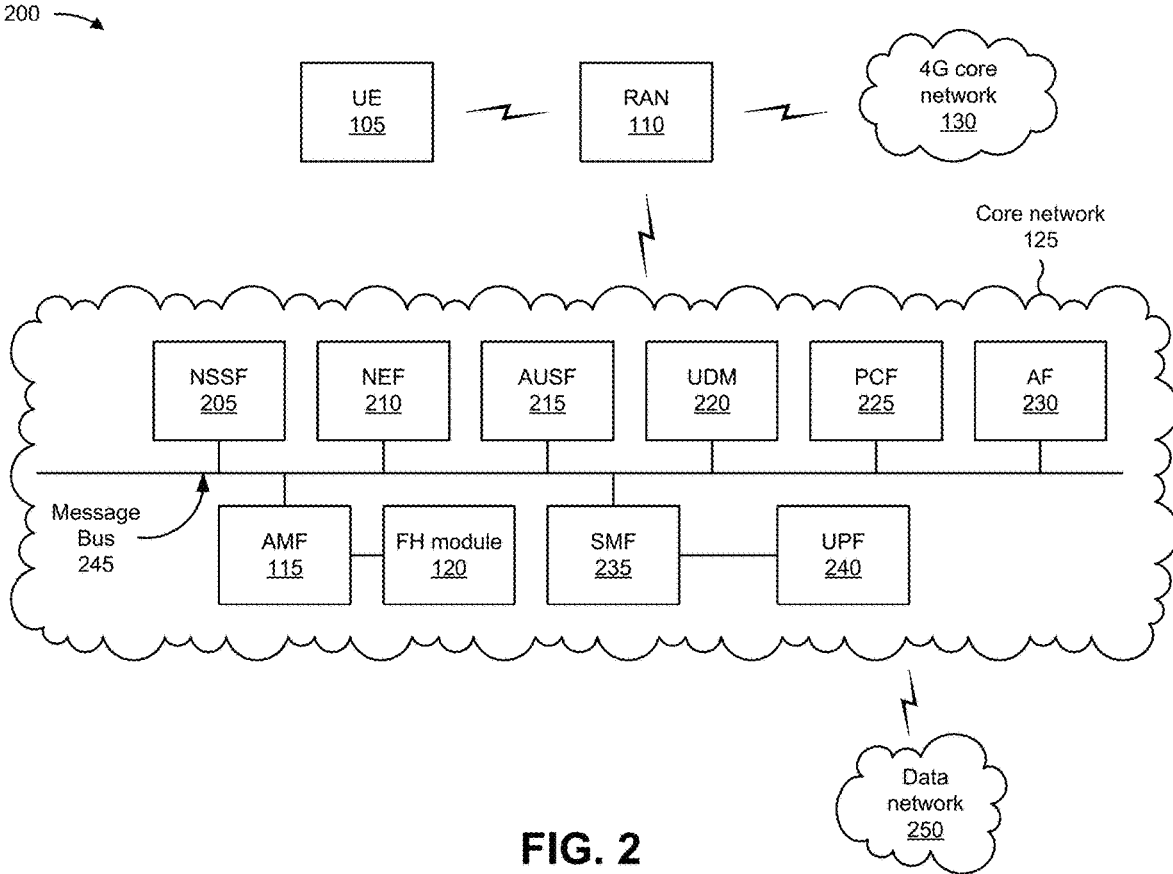
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include the UE 105, the RAN 110, the 5G core network 125, the 4G core network 130, and a data network 250. Devices and/or networks of example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, and/or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the 5G core network 125 or the 4G core network 130.

In some implementations, the RAN 110 may perform scheduling and/or resource management for the UE covered by the RAN 110 (e.g., the UE covered by a cell provided by RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, and/or a similar module or component. In other words, the RAN 110 may perform network control, scheduling, and/or network management functions (e.g., for uplink, downlink, and/or sidelink communications of the UE 105 covered by the RAN 110).

In some implementations, the 5G core network 125 may include an example functional architecture in which systems and/or methods described herein may be implemented. For example, the 5G core network 125 may include an example architecture of a 5G next generation (NG) core network included in a 5G wireless telecommunications system. While the example architecture of the 5G core network 125 shown in FIG. 2 may be an example of a service-based architecture, in some implementations, the 5G core network 125 may be implemented as a reference-point architecture and/or a 4G core network, among other examples.

As shown in FIG. 2, the 5G core network 125 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, the AMF 115, the FH module 120, a session management function (SMF) 235, and/or a user plane function (UPF) 240. These functional elements may be communicatively connected via a message bus 245. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access and/or mobile access in the 5G core network 125.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 115 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The message bus 245 represents a communication structure for communication among the functional elements. In other words, the message bus 245 may permit communication between two or more functional elements.

The 4G core network 130 may include an EPS that includes a long-term evolution (LTE) network and/or an evolved packet core (EPC) that operate based on the 3GPP wireless communication standard. The LTE network may include a RAN that includes one or more base stations that take the form of evolved Node Bs (eNBs) via which the UE 105 communicates with the EPC.

The data network 250 includes one or more wired and/or wireless data networks. For example, the data network 250 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
FIG. 3 is a diagram of example components of one or more devices of FIG. 2.
Figure 3:
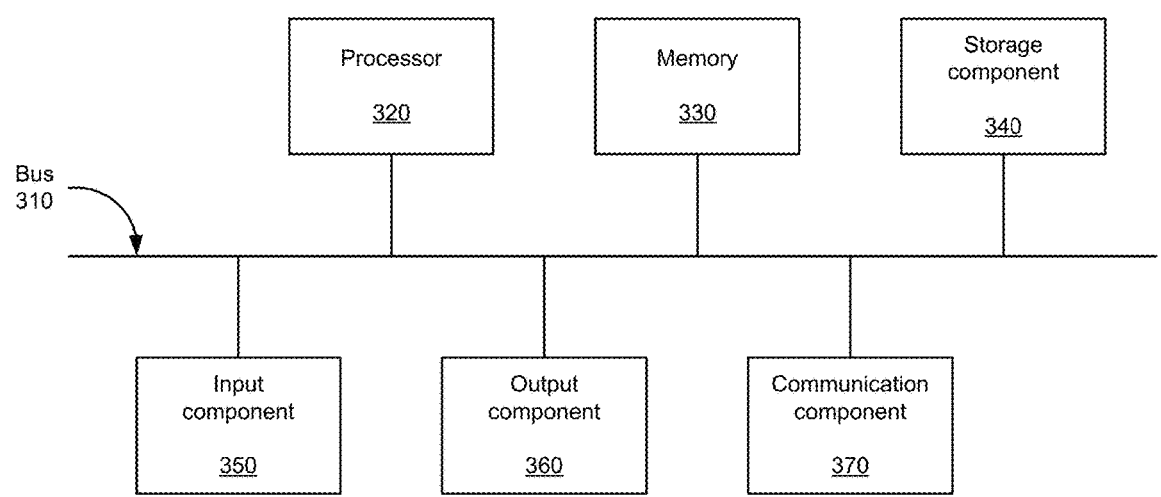

FIG. 3 is a diagram of example components of a device 300, which may correspond to the UE 105, the RAN 110, the NEF 210, the AUSF 215, the UDM 220, the PCF 225, the AF 230, the AMF 115, the FH module 120, the SMF 235, and/or the UPF 240. In some implementations, the UE 105, the RAN 110, the NEF 210, the AUSF 215, the UDM 220, the PCF 225, the AF 230, the AMF 115, the FH module 120, the SMF 235, and/or the UPF 240 may include one or more devices 300 and/or one or more components of device 300. As shown in FIG. 3, device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The storage component 340 stores information and/or software related to the operation of device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables the device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables the device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
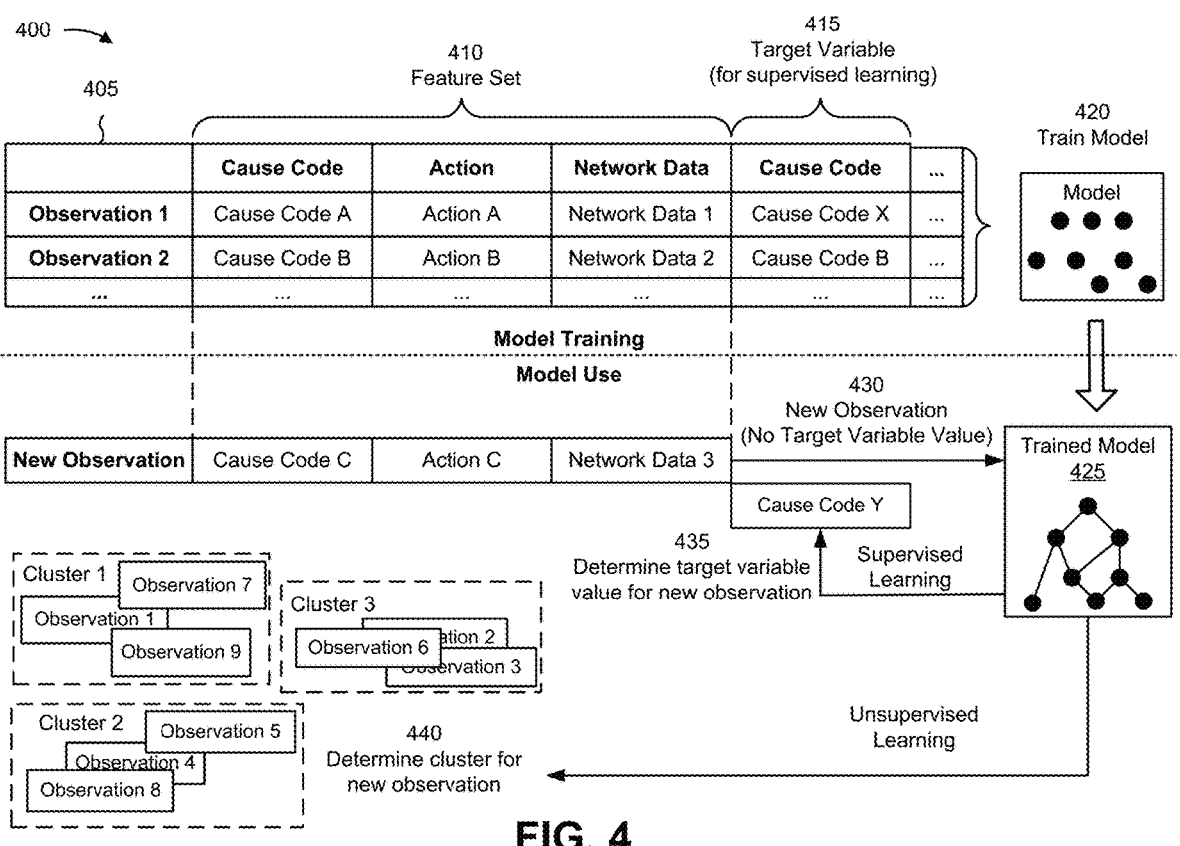
FIG. 4 is a diagram illustrating an example of training and using a machine learning model in connection with providing network failure and cause code handling in 5G networks.

FIG. 4 is a diagram illustrating an example 400 of training and using a machine learning model in connection with providing network failure and cause code handling in 5G networks. The machine learning model training and usage described herein may be performed using a machine learning system. The machine learning system may include or may be included in a computing device, a server, a cloud computing environment, or the like, such as the FH module 120 described in more detail elsewhere herein.

As shown by reference number 405, a machine learning model may be trained using a set of observations. The set of observations may be obtained from training data (e.g., historical data), such as data gathered during one or more processes described herein. In some implementations, the machine learning system may receive the set of observations (e.g., as input) from FH module 120, as described elsewhere herein.

As shown by reference number 410, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from FH module 120. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of cause code (e.g., a cause code received by the AMF 115), a second feature of action (e.g., an action associated with the cause code received by the AMF 115), a third feature of network data (e.g., health and/or network data associated with the 5G core network 125 and/or the 4G core network 130), and so on. As shown, for a first observation, the first feature may have a value of cause code A, the second feature may have a value of action A, the third feature may have a value of network data 1, and so on. These features and feature values are provided as examples, and may differ in other examples.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 400, the target variable is cause code (e.g., a cause code determined by the FH module 120 and that is to be provided to the UE 105), which has a value of cause code X for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include a first feature of cause code, a second feature of action, a third feature of network data, and so on, as an example. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425 may predict a value of cause code Y for the target variable of cause code for the new observation, as shown by reference number 435. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 425 may classify (e.g., cluster) the new observation in a cluster, as shown by reference number 440. The observations within a cluster may have a threshold degree of similarity. As an example, if the machine learning system classifies the new observation in a first cluster, then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to providing network failure and cause code handling in 5G networks. The machine learning system enables recognition and/or identification of tens, hundreds, thousands, or millions of features and/or feature values for tens, hundreds, thousands, or millions of observations, thereby increasing accuracy and consistency and reducing delay associated with providing network failure and cause code handling in 5G networks relative to requiring computing resources to be allocated for tens, hundreds, or thousands of operators to manually provide network failure and cause code handling in 5G networks using the features or feature values.

As indicated above, FIG. 4 is provided as an example. Other examples may differ from what is described in connection with FIG. 4.

FIG. 5 is a flowchart of an example process 500 for providing network failure and cause code handling in 5G networks. In some implementations, one or more process blocks of FIG. 5 may be performed by a network device (e.g., the AMF 115 and the FH module 120). In some implementations, one or more process blocks of FIG. 5 may be performed by another device or a group of devices separate from or including the network device, such as an NSSF (e.g., the NSSF 205), an NEF (e.g., the NEF 210), an AUSF (e.g., the AUSF 215), a UDM (e.g., the UDM 220), a PCF (e.g., the PCF 225), an AF (e.g., the AF 230), an SMF (e.g., the SMF 235), and/or a UPF (e.g., the UPF 240). Additionally, or alternatively, one or more process blocks of FIG. 5 may be performed by one or more components of the device 300, such as the processor 320, the memory 330, the storage component 340, the input component 350, the output component 360, and/or the communication component 370.

As shown in FIG. 5, process 500 may include receiving historical data associated with a first core network (block 510). For example, the network device may receive historical data identifying historical error data and error data categorizations associated with the first core network, as described above. The network device may include an AMF of the first core network, an FH module incorporated within the AMF, or an FH module separate from and associated with the AMF. The first core network may include a 5G core network. The second core network may include a 4G core network. In some implementations, the network device may store the historical data in a data structure, as described above.

In some implementations, the error data categorizations may include a categorization of error data based on types of UE, a categorization of error data based on interactions with network devices of the first core network, a categorization of error data based on a source of a failure associated with the first core network, and/or a categorization of error data based on the network devices of the first core network that are associated with the failure.

As further shown in FIG. 5, process 500 may include receiving a request associated with a UE (block 520). For example, the network device may receive a request associated with a UE, as described above. The request may include a registration request, a periodic registration request, a mobility change request associated with the UE, an initial registration request, and/or a service request.

As further shown in FIG. 5, process 500 may include receiving error data from the first core network (block 530). For example, the network device may receive error data from the first core network based on the request, as described above.

As further shown in FIG. 5, process 500 may include receiving network health data associated with the first core network and a second core network (block 540). For example, the network device may receive network health data identifying load levels and health of the first core network and a second core network, as described above.

As further shown in FIG. 5, process 500 may include determining possible cause data identifying causes associated with the error data (block 550). For example, the network device may process one or more of the historical data, the error data, and the network health data, with a machine learning model, to determine possible cause data identifying causes associated with the error data, as described above.

The causes associated with the error data may include whether a failure associated with the first core network is transient or persistent, a magnitude of a problem associated with the first core network, an impact of retries by the UE on the first core network, and/or a probability of the UE receiving service from the second core network. The magnitude of the problem may be based on whether the problem is specific to a particular set of UE, whether the problem is specific to a geographical region, a percentage of UEs experiencing the problem, an expected loss of service by a plurality of UEs, a source of the failure, and/or network devices of the first core network that are experiencing the failure.

As further shown in FIG. 5, process 500 may include generating a cause code for the UE (block 560). For example, the network device may process the possible cause data, with the machine learning model, to generate a cause code for the UE, as described above. In some implementations, the network device may generate a first cause code indicating congestion associated with a particular network device that is common to the first core network and the second core network. The first cause code may cause the UE to retry the request. In some implementations, the network device may receive a retry of the request, associated with the UE, based on providing the first cause code to the UE.

Alternatively, and/or additionally, the network device may generate a second cause code indicating congestion associated with another particular network device of only the first core network. The second cause code may cause the UE to connect to the second core network.

As further shown in FIG. 5, process 500 may include providing the cause code to the UE (block 570). For example, the network device may provide the cause code to the UE, as described above. In some implementations, the network device may receive feedback associated with the cause code. The network device may update the machine learning model based on the feedback.

14

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device, error data associated with a user equipment;
determining, by the network device, possible cause data identifying causes associated with the error data;
generating, by the network device, a cause code for the user equipment based on the cause data; and
providing, by the network device, the cause code to the user equipment.

2. The method of claim 1, further comprising:
receiving a request associated with the user equipment; and
wherein receiving the error data comprises:
receiving the error data from a core network based on the request.

3. The method of claim 1, further comprising:
receiving historical data associated with a core network; and
wherein determining the possible cause data comprises:
determining the possible cause data based on the historical data.

4. The method of claim 1, further comprising:
receiving network health data associated with a network; and
wherein determining the possible cause data comprises:
determining the possible cause data based on the network health data.

5. The method of claim 4, wherein the network health data includes data associated with a 5G core network or a 4G core network.

6. The method of claim 1, wherein the causes associated with the error data include one or more of:
whether a failure associated with a core network is transient or persistent,
a magnitude of a problem associated with a core network,
an impact of retries by the user equipment on a core network, or
a probability of the user equipment receiving service from a core network.

7. The method of claim 6, wherein the magnitude of the problem is based on one or more of:
whether the problem is specific to a particular set of user equipment that includes the user equipment,
whether the problem is specific to a geographical region,
a percentage of user equipment experiencing the problem,
an expected loss of service by the user equipment,
a source of the failure, or
network devices that are experiencing the failure.

8. A network device, comprising:
one or more processors configured to:
receive first data from a network based on a request associated with a user equipment;
determine second data identifying causes associated with the first data;

generate a cause code for the user equipment based on the second data; and
provide the cause code to the user equipment.

9. The network device of claim 8, wherein the first data includes data associated with errors or failures in a core network.

10. The network device of claim 8, wherein the cause code causes the user equipment to retry the request.

11. The network device of claim 8, wherein the first data is error data and the second data is possible cause data, and
wherein the one or more processors are further configured to:
receive network health data associated with the network; and
wherein the one or more processors, to determine the second data, are configured to:
determine the possible cause data, wherein the possible cause data identifies causes associated with the error data based on the network health data.

12. The network device of claim 8, wherein the network device includes one of:
an access and mobility management function (AMF) of the network,
a failure handling module incorporated within the AMF, or
a failure handling module associated with the AMF.

13. The network device of claim 8, wherein the one or more processors, to determine the second data, are configured to:
determine, utilizing a machine learning model, the second data; and
wherein the one or more processors are further configured to:
receive feedback associated with the cause code; and
update the machine learning model based on the feedback.

14. The network device of claim 8, wherein the request includes one of:
a service request,
a periodic registration request,
a mobility change request associated with the user equipment, or
an initial registration request.

15. A non-transitory computer-readable medium storing a set of instructions, the set of instructions comprising:
one or more instructions that, when executed by one or more processors of a network device, cause the network device to:
receive error data associated with a user equipment;
process the error data to determine possible cause data identifying causes associated with the error data;
process the possible cause data, with a machine learning model, to generate a cause code for the user equipment; and
provide the cause code to the user equipment.

16. The non-transitory computer-readable medium of claim 15, wherein the one or more instructions further cause the network device to:
receive a request, associated with the user equipment, based on providing the cause code to the user equipment.

17. The non-transitory computer-readable medium of claim 15, wherein the cause code causes the user equipment to connect to a core network.

18. The non-transitory computer-readable medium of claim 15, wherein the one or more instructions, that cause the network device to process the possible cause data, cause the network device to:

generate a first cause code indicating congestion associated with a particular network device.

19. The non-transitory computer-readable medium of claim 15, wherein the cause code causes the use equipment to wait for a time period before re-attempting to connect to a core network.

20. The non-transitory computer-readable medium of claim 15, wherein the causes associated with the error data include one or more of:

whether a failure associated with a core network is transient or persistent, a magnitude of a problem associated with a core network, an impact of retries by the user equipment on a core network, or a probability of the user equipment receiving service from a core network.

\* \* \* \* \*

18